(12) United States Patent
Ahn

(10) Patent No.: US 11,801,831 B2
(45) Date of Patent: Oct. 31, 2023

(54) PARKING CONTROL APPARATUS AND PARKING CONTROL METHOD

(71) Applicant: HYUNDAI MOBIS Co., Ltd., Seoul (KR)

(72) Inventor: Sang Ho Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 205 days.

(21) Appl. No.: 17/475,763

(22) Filed: Sep. 15, 2021

(65) Prior Publication Data

US 2022/0089148 A1 Mar. 24, 2022

(30) Foreign Application Priority Data

Sep. 18, 2020 (KR) ................. 10-2020- 0120432

(51) Int. Cl.
*B60W 30/06* (2006.01)
*B60W 50/14* (2020.01)

(52) U.S. Cl.
CPC ............ *B60W 30/06* (2013.01); *B60W 50/14* (2013.01); *B60W 2420/52* (2013.01); *B60W 2552/15* (2020.02); *B60W 2554/802* (2020.02); *B60W 2710/18* (2013.01); *B60W 2720/24* (2013.01)

(58) Field of Classification Search
CPC .. B60W 30/06; B60W 50/14; B60W 2552/15; B60W 2554/802; B60W 2420/52; B60W 2710/18; B60W 2720/24
USPC ........................................................ 701/436
See application file for complete search history.

(56) References Cited

U.S. PATENT DOCUMENTS

| 6,583,753 | B1* | 6/2003 | Reed ...................... G01S 13/931 342/72 |
| 8,098,173 | B2* | 1/2012 | Hueppauff ........... B62D 15/028 382/104 |
| 10,106,153 | B1* | 10/2018 | Xiao ........................ G06F 18/24 |
| 10,214,239 | B2* | 2/2019 | Lee ............................ B60R 1/00 |
| 10,392,009 | B2* | 8/2019 | Kim ...................... B60W 50/14 |
| 10,449,955 | B2* | 10/2019 | Kim ...................... B60W 50/14 |
| 10,906,530 | B2* | 2/2021 | Kim ...................... G05D 1/0044 |

(Continued)

FOREIGN PATENT DOCUMENTS

| CN | 107945566 A | * | 4/2018 | ............. G07B 15/02 |
| CN | 110293965 A | * | 10/2019 | ............ B60W 30/06 |

(Continued)

*Primary Examiner* — Atul Trivedi
(74) *Attorney, Agent, or Firm* — Morgan, Lewis & Bockius LLP

(57) ABSTRACT

A parking control apparatus and a parking control method are provided. According to at least one aspect, the present disclosure provides a parking control apparatus including a signal processor, a determinator, and a controller. the signal processor is configured to receive first to Nth radar signals reflected from first to Nth regions of a ground surface from one or more radars disposed in a vehicle and to calculate information about the first to Nth regions, wherein N is a natural number. the determinator is configured to determine whether the ground surface is a slope based on the information about the first to Nth regions and to determine whether parking the vehicle is possible. the controller is configured to generates control information for controlling parking of the vehicle according to a determination result of the determinator.

11 Claims, 5 Drawing Sheets

(56) References Cited

U.S. PATENT DOCUMENTS

| | | | |
|---|---|---|---|
| 10,919,574 B2 * | 2/2021 | Kim | G05D 1/0061 |
| 11,393,340 B2 * | 7/2022 | Kim | B62D 15/028 |
| 2003/0058132 A1 * | 3/2003 | Maier | G01S 13/931 |
| | | | 340/932.2 |
| 2017/0132482 A1 * | 5/2017 | Kim | G06V 20/586 |
| 2019/0049977 A1 * | 2/2019 | Dean | G05D 1/0225 |
| 2019/0072666 A1 * | 3/2019 | Duque Biarge | G01S 13/9023 |
| 2019/0302258 A1 * | 10/2019 | Lee | G01S 15/931 |
| 2019/0384303 A1 * | 12/2019 | Muller | G05D 1/027 |

FOREIGN PATENT DOCUMENTS

| | | | | |
|---|---|---|---|---|
| CN | 110775052 A | * | 2/2020 | ............ B60W 30/06 |
| CN | 110962843 A | * | 4/2020 | ............ B60W 30/06 |
| CN | 210454624 U | * | 5/2020 | |
| CN | 112977431 A | * | 6/2021 | ............ B60W 30/06 |
| CN | 114555446 A | * | 5/2022 | ............ B60W 30/10 |
| CN | 115273536 A | * | 11/2022 | |
| DE | 102021102299 A1 | * | 8/2022 | |
| KR | 20220033583 A | * | 3/2022 | ............ B60W 30/06 |
| WO | WO-2020105166 A1 | * | 5/2020 | |

\* cited by examiner

PARKING CONTROL APPARATUS AND PARKING CONTROL METHOD

CROSS-REFERENCE TO RELATED APPLICATION

This application claims priority to and the benefit of Korean Patent Application No. 10-2020-0120432, filed on Sep. 18, 2020, the disclosure of which is incorporated herein by reference in its entirety.

BACKGROUND

1. Technical Field

The present disclosure relates to a parking control apparatus and a parking control method.

2. Discussion of Related Art

With the increases in safety and convenience functions for drivers, such as autonomous emergency braking (AEB), smart cruise control (SCC), parking assist, automated parking, and autonomous valet parking, sensors for detecting surrounding situations of a vehicle are being actively developed. Sensors attached to a vehicle include image sensors, laser induced detection and ranging (LiDAR), radar, and ultrasonic sensors.

Among the sensors, the radar may be disposed inside the vehicle unlike the LiDAR and may observe a greater distance as compared with the ultrasonic sensor. Also, unlike the image sensor, a radar sensor is hardly affected by weather or the like.

For this reason, radar is mainly used in a parking control apparatus for a vehicle. However, in the conventional parking control apparatus, radar is used for the purpose of detecting obstacles present in a traveling direction of a vehicle, and a radar signal reflected from a ground surface is determined as noise and removed. Accordingly, when the vehicle is parked using the parking control apparatus, it is difficult to recognize conditions of a ground surface, which act as parking obstacle factors, such as a slope and a pothole, and thus, there is a problem in that physical damage such as vehicle damage may occur.

SUMMARY

The present disclosure is directed to providing a parking control apparatus which prevents accidents such as vehicle damage by recognizing conditions of a ground surface, which act as parking obstacle factors, such as a slope and a pothole, using radar, and a parking control method.

According to at least one aspect, the present disclosure provides a parking control apparatus including a signal processor, a determinator, and a controller. the signal processor is configured to receive first to Nth radar signals reflected from first to Nth regions of a ground surface from one or more radars disposed in a vehicle and to calculate information about the first to Nth regions, wherein N is a natural number. the determinator is configured to determine whether the ground surface includes a slope based on the information about the first to Nth regions and to determine whether parking the vehicle is possible. the controller is configured to generates control information for controlling parking of the vehicle according to a determination result of the determinator.

According to another aspect, the present disclosure provides a parking control method including receiving first to Nth radar signals reflected from first to Nth regions of a ground surface from one or more radars disposed in a vehicle, calculating information about the first to Nth regions based on the first to Nth radar signals, determining whether the ground surface includes a slope based on the information about the first to Nth regions and whether parking the vehicle is possible, and generating control information for controlling parking of the vehicle according to a determination result.

DETAILED DESCRIPTION OF EXEMPLARY EMBODIMENTS

Figure 1:
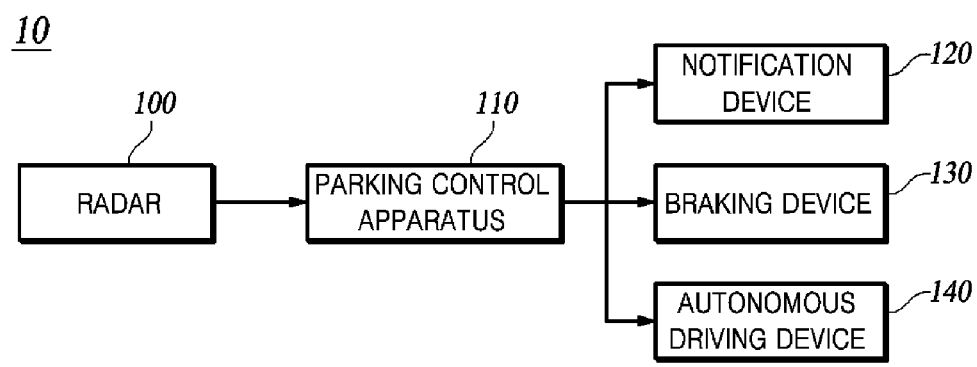
FIG. 1 is an exemplary diagram for describing a configuration for controlling parking according to one embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is an exemplary diagram for describing a configuration for controlling parking according to one embodiment of the present disclosure.

Referring to FIG. 1, a vehicle 10 may include all or some of a radar 100, a parking control apparatus 110, a notification device 120, a braking device 130, and an autonomous driving device 140. All blocks shown in FIG. 1 are not essential components, and some blocks included in the vehicle 10 may be added, changed, or removed in other embodiments. For example, a vehicle 10, which does not support an autonomous emergency braking function, may not include the braking device 130, and a vehicle 10, which does not support an autonomous driving function, may not include the autonomous driving device 140.

The radar 100 is a sensor that detects surrounding situations of the vehicle in order to provide parking-related functions such as parking assist, automated parking, and autonomous valet parking.

The radar 100 may be an ultra-wide band (UWB) radar that transmits and receives a radar signal in an ultra-wide frequency band or a frequency modulated continuous-wave (FMCW) radar that transmits and receives a radar signal including a modulated frequency signal. The radar 100 may be configured to adjust a detection range by adjusting an output value of a transmission signal using an amplifier (not shown) disposed therein.

The radar 100 may include a plurality of transmitters (not shown) and a plurality of receivers (not shown). All of the plurality of receivers may receive a reflected signal for a radar signal transmitted by the transmitter of the radar 100. That is, the radar 100 may have a multi-input multi-output (MIMO) radar structure. The radar 100 may have a field of view (FOV) of 140° to 160°.

A plurality of radars 100 may be disposed to face in at least one direction of a front direction, a rear direction, and side directions of the vehicle. That is, at least one radar 100 may transmit a radar signal in at least one direction of the front direction, the rear direction, and the side directions of the vehicle and may receive a radar signal reflected by a ground surface.

In response to receiving the reflected radar signal, the radar 100 may be configured to transmit the reflected radar signal to the parking control apparatus 110.

The parking control apparatus 110 may be configured to determine whether parking is possible on a ground surface around the vehicle 10 based on a radar signal acquired from the radar 100. Meanwhile, according to one embodiment of the present disclosure, the parking control apparatus 110 may be a type of local electronic controller (ECU) which performs a function of storing and processing a radar signal acquired from the radar 100 in connection with the radar 100. According to another embodiment of the present disclosure, the parking control apparatus 110 may be implemented as one component on a local ECU.

The notification device 120 may be configured to visually or audibly notify a driver in response to the parking control apparatus 110 determining that parking the vehicle 10 is impossible. According to one embodiment of the present disclosure, the notification device 120 may include a speaker which audibly notifies the driver using a prerecorded voice or a beep sound in response to determining that parking the vehicle 10 is impossible. The notification device 120 may include a display which visually notifies the driver of information about a slope.

The braking device 130 may be configured to decelerate or brake the vehicle 10. In response to determining that parking the vehicle 10 is impossible, the parking control apparatus 110 may be configured to transmit control information to the braking device 130. The braking device 130 may be configured to receive the control information and to apply a braking force to the vehicle without intervention of the driver.

The autonomous driving device 140 may be configured to set a route of the vehicle 10 and to control a steering angle of the vehicle 10 accordingly. In response to determining that parking the vehicle 10 is impossible, the parking control apparatus 110 may be configured to transmit control information to the autonomous driving device 140. The autonomous driving device 140 may be configured to receive the control information and to change a route of the vehicle without intervention of the driver so as to avoid a slope.

Figure 2:
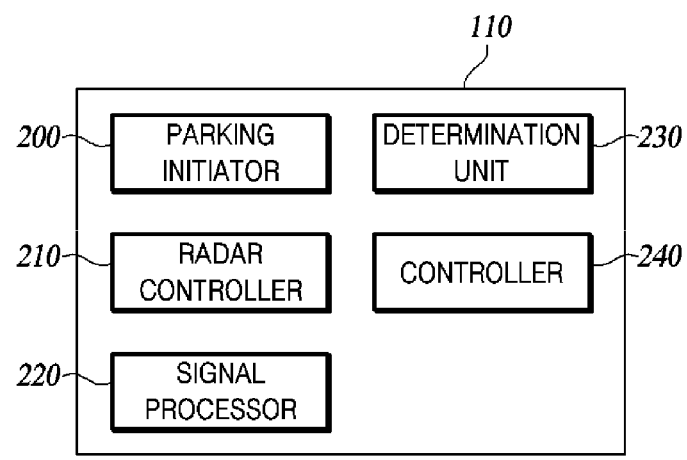
FIG. 2 is a schematic block diagram illustrating a parking control apparatus according to one embodiment of the present disclosure.

FIG. 2 is a schematic block diagram illustrating a parking control apparatus according to one embodiment of the present disclosure.

Referring to FIG. 2, a parking control apparatus 110 may include one or more processor(s) and an associated non-transitory memory storing software instructions which, when executed by the one or more processor(s), provides all or some of the functionalities of a parking initiator 200, a radar controller 210, a signal processor 220, a determinator 230, and a controller 240. All blocks shown in FIG. 2 are not essential components, and some blocks included in the parking control apparatus 110 may be added, changed, or removed in other embodiments.

The parking initiator 200 may be configured to acquire a parking initiation signal of a vehicle 10 and to determine whether to initiate a parking control operation. According to one embodiment of the present disclosure, the parking initiator 200 may be configured to receive the parking initiation signal from a user using a touch panel or at least one physical button for changing setting values of various functions. According to another embodiment of the present disclosure, in response to the vehicle 10 entering a specific position such as a parking lot or in response to the vehicle 10 traveling in reverse, the parking initiator 200 may be configured to acquire the parking ignition signal. In response to initiating the parking control operation, the parking initiator 200 may be configured to transmits the parking initiation signal to a radar controller 210 of the parking control apparatus 110.

In response to receiving the parking initiation signal, the radar controller 210 may be configured to electronically or mechanically control a detection angle of the radar 100 such that the radar 100 transmits a radar signal toward a ground surface. For example, the radar controller 210 may be configured to cause the radar 100 to turn toward a ground surface by a preset angle or to transmit a radar signal toward the ground surface by using a beam forming technology.

FIGS. 3A, 3B, 4A and 4B show exemplary diagrams for describing a radar control method according to one embodiment of the present disclosure.

In FIGS. 3A, 3B, 4A and 4B, radars disposed at the rear of a vehicle will be mainly described, but embodiments of the present disclosure may be equally applied to radars disposed at the side and front of the vehicle. In addition, although the radars are illustrated in FIGS. 3A, 3B, 4A and 4B as being disposed outside the vehicle, this is for convenience of description, and the radars may be disposed inside the vehicle.

A radar controller 210 according to one embodiment of the present disclosure may be configured to control a detection angle of a radar such that the radar sequentially transmits radar signals toward first to $N^{th}$ regions on a ground surface (N=natural number).

Figure 3A:
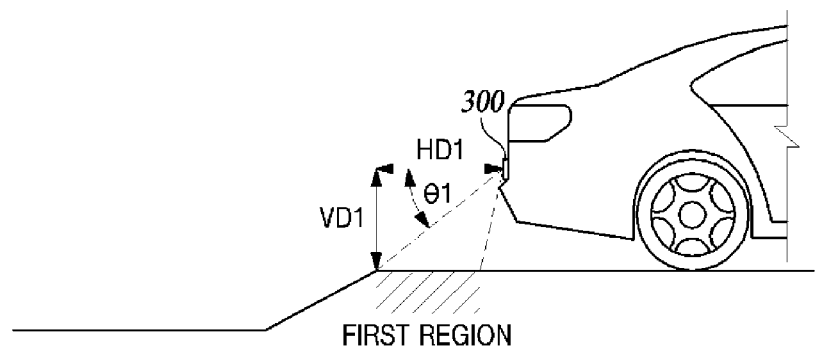
FIGS. 3A, 3B, 4A and 4B show exemplary diagrams for describing a radar control method according to one embodiment of the present disclosure.
Figure 3B:
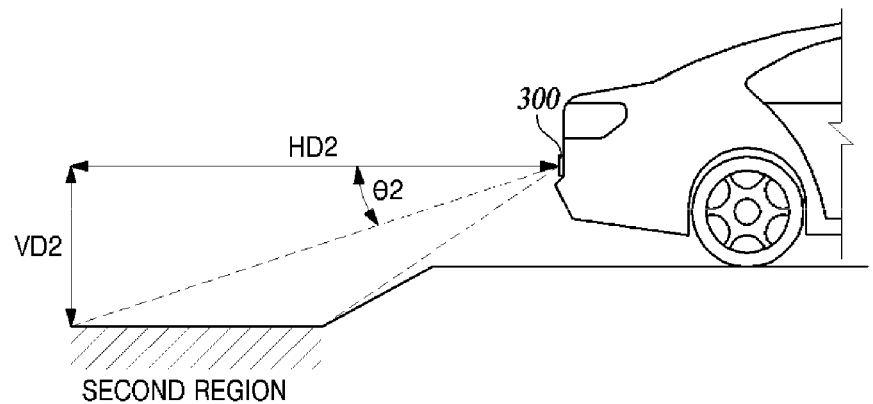

For example, referring to FIG. 3A, at a first time point, the radar controller 210 may be configured to set a detection angle of a radar to $\theta 1$ such that a radar 300 transmits a radar signal toward the first region. Thereafter, referring to FIG. 3B, at a second time point, the radar controller 210 may be configured to set a detection angle of a radar to $\theta 2$ such that the radar 300 transmits a radar signal toward the second region. In this case, the radar controller 210 may include a storage unit (not shown) which stores detections angles $\theta 1$ to $\theta N$ of the radar 300 for transmitting radar signals toward the first to $N^{th}$ regions. According to one embodiment of the present disclosure, a parking control apparatus 110 may be configured to detect a slope present at the rear of a vehicle.

A radar controller 210 according to another embodiment of the present disclosure may be configured to control a plurality of radars 400 and 402 such that each of different radars 400 and 402 transmits a radar signal toward one of first to $N^{th}$ regions.

Figure 4A:
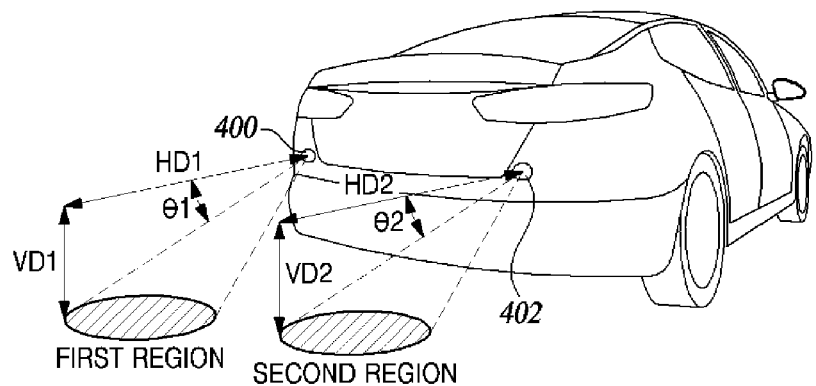

For example, referring to FIG. 4A, the radar controller 210 may be configured to control a first radar 400 to transmit a radar signal toward the first region and control a second radar 402 to transmit a radar signal toward the second region. According to one embodiment of the present disclosure, a parking control apparatus 110 may be configured to detect a pothole present at the rear left or rear right of a vehicle.

The radar controller 210 according to another embodiment of the present disclosure may be configured to control the plurality of radars 400 and 402 such that at least one radar transmits a radar signal toward a ground surface, and at least another radar transmits a radar signal toward a traveling direction of the vehicle.

Figure 4B:
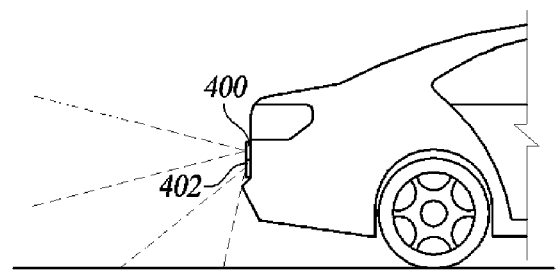

For example, referring to FIG. 4B, the radar controller 210 may be configured to control the first radar 400 to transmit a radar signal toward the traveling direction of the vehicle and control the second radar 402 to transmit a radar signal toward the ground surface. According to one embodiment of the present disclosure, the parking control apparatus 110 may be configured to detect an obstacle present at the rear of the vehicle together with a slope and a pothole which act as parking obstacle factors.

Referring to FIG. 2 again, the signal processor 220 may be configured to receive first to $N^{th}$ radar signals reflected from first to $N^{th}$ regions on the ground surface from one or more radars.

According to one embodiment of the present disclosure, the signal processor 220 may be configured to filter valid signals including valid information from radar signals. In response to determining that an intensity of a filtered signal exceeds a reference value, the signal processor 220 may be configured to determine the filtered signal as a valid signal. Here, the reference value is a value for distinguishing a signal, in which a radar signal is reflected by an object, from noise, and may be synonymous with a threshold value. That is, in response to determining that an intensity of a signal received from the radar 100 is greater than the reference value, the signal processor 220 may be configured to determine the received signal as a signal reflected by a ground surface around the vehicle. The reference value may be a preset fixed value but may be a variable value that is changed over time according to a preset algorithm.

According to one embodiment of the present disclosure, the signal processor 220 may be configured to calculate a horizontal distance and a vertical distance between the vehicle and the ground surface using a valid signal. For example, a first valid signal may be extracted by filtering the first radar signal reflected from the first region, and a first horizontal distance and a first vertical distance between the vehicle and the first region may be calculated using the first valid signal.

According to one embodiment of the present disclosure, the signal processor 220 may be configured to calculate first to $N^{th}$ radar cross sections (hereinafter, referred to as "RCSs") of the first to $N^{th}$ radar signals. Here, the term "RCS" refers to a value, in which a magnitude of an electromagnetic wave emitted from a radar, which is returned by being reflected by a target, is expressed in units of area.

The determinator 230 may be configured to determine whether a ground surface around the vehicle 10 is a slope based on information about the first to $N^{th}$ regions.

According to one embodiment of the present disclosure, when a difference between the first vertical distance between the vehicle and the first region and a second vertical distance between the vehicle and the second region is greater than a preset vertical distance limit, the determinator 230 may be configured to determine that a ground surface abound the vehicle is a slope. For example, referring to FIG. 3, when a difference between a first vertical distance VD1 and a second vertical distance VD2 is greater than the preset vertical distance limit, the determinator 230 may be configured to determine that the ground surface around the vehicle is a slope. In this case, the vertical distance limit may be set to a height at which there is no risk of scratching of a lower part of a vehicle or no risk of falling of the vehicle even when there is an inclination on the ground surface.

According to one embodiment of the present disclosure, the determinator 230 may be configured to determine whether the ground surface is a slope based on a change amount between the first to the $N^{th}$ RCSs.

The term "RCS" refers to a ratio of a magnitude of an electromagnetic wave returned by being scattered from a target and a magnitude of an electromagnetic wave incident on the target and represents a physical size of the target viewed from a radar. An RCS varies according to the size, shape, direction, and material of a target. The electrical characteristics, physical size, geometric shape, radar frequency, observation angle, and the like of a target may be factors that determine an RCS. Specifically, even though targets have the same size, an RCS is greater when a current flows well on a surface, and even though targets have the same electrical characteristics, an RCS is greater when a physical size is larger. In addition, an RCS also varies according to geometric shapes of a target, such as a flat surface, an inwardly curved surface, and an outwardly curved surface, and as a radar frequency becomes higher, an RCS becomes greater. In addition, even though the same target is observed, an RCS varies greatly according to a viewing angle.

Accordingly, when a slope is present between the first to $N^{th}$ regions, a geometric shape and viewing angle of a ground surface are different from those of a case in which only a flat ground surface is present, and thus, a change amount greater than or equal to a preset change amount limit may be detected between the first to $N^{th}$ RCSs. When a change amount between the first to $N^{th}$ RCSs is greater than the preset change amount limit, the determinator 230 may be configured to determine that the ground surface around the vehicle is a slope. For example, when a change amount between the first RCS and the second RCS is greater than the preset change amount limit, the determinator 230 may be configured to determine that the ground surface around the vehicle is a slope.

According to another embodiment of the present disclosure, the determinator 230 may be configured to increase the accuracy of determining a slope in consideration of both an RCS and a vertical distance between the vehicle and the first to $N^{th}$ regions. For example, the determinator 230 may be configured to determine whether the ground surface around the vehicle is a slope using a difference between the first vertical distance between the vehicle 10 and the first region and the second vertical distance between the vehicle 10 and the second region, and to correct a result of determining the slope using the first RCS and the second RCS.

In response determining that a ground surface around the vehicle 10 is a slope, the determinator 230 may be configured to detect inclined regions from among the first to $N^{th}$ regions.

According to one embodiment of the present disclosure, when a difference between the first vertical distance and the second vertical distance is greater than the preset vertical distance limit or a change amount between the first RCS and the second RCS is greater than the preset change amount limit, the determinator 230 may be configured to detect the first region and the second region as inclined regions.

According to another embodiment of the present disclosure, the determinator 230 may be configured to subdivide the first region and the second region into a plurality of sub-regions and may be configured to detect inclined regions from among the plurality of sub-regions. For example, the determinator 230 may be configured to subdivide the first region and the second region into M sub-regions (M=natural number) and may be configured to control the radars to transmit radar signals toward the first to $M^{th}$ sub-regions. The determinator 230 may be configured to receive radar signals reflected from the first to $M^{th}$ sub-regions, may be configured to calculate information about the first to $M^{th}$ sub-regions, and may be configured to select inclined regions from among the first to $M^{th}$ sub-regions based on the received radar signals.

The determinator 230 may be configured to determine whether parking the vehicle is possible.

According to one embodiment of the present disclosure, when a horizontal distance between the vehicle 10 and an inclined region is less than a preset horizontal distance limit, the determinator 230 may be configured to determine that parking the vehicle 10 is impossible. For example, referring to FIG. 3, when a first horizontal distance HD1 between the vehicle 10 and the first region or a second horizontal distance HD2 between the vehicle 10 and the second region is less than the preset horizontal distance limit, the determinator 230 may be configured to determine that the vehicle 10 is in proximity to an inclined region and parking the vehicle 10 is impossible.

According to another embodiment of the present disclosure, the determinator 230 may be configured to estimate a gradient of a ground surface, and when the gradient is greater than a present gradient limit, the determinator 230 may be configured to determine that parking the vehicle 10 is impossible. For example, the determinator 230 may be configured to estimate a gradient of a ground surface using the first to the $N^{th}$ RCSs, and when the estimated gradient is greater than the preset gradient limit, the determinator may be configured to determine that parking the vehicle 10 is impossible. To this end, the determinator 230 may be configured to prestore RCS information according to a gradient of a ground surface and may be configured to use the RCS information to estimate a gradient of a ground surface.

The determinator 230 may be configured to transmit a determination result to the controller 240.

The controller 240 configured to generate control information for controlling parking of the vehicle according to the determination result of the determinator 230.

According to one embodiment of the present disclosure, the controller 240 may be configured to generate first control information for notifying the driver of the vehicle that parking the vehicle on a slope is impossible and transmits the first control information to the notification device 120.

According to one embodiment of the present disclosure, in response to determining that parking the vehicle on a slope is impossible, the controller 240 may be configured to generate and transmit second control information for braking the vehicle to the braking device 130.

According to one embodiment of the present disclosure, in response to determining that parking the vehicle on a slope is impossible, the controller 240 may be configured to generate third control information for changing a route of the vehicle so as to avoid the slope and transmits the third control information to an autonomous driving device 140.

Figure 5:
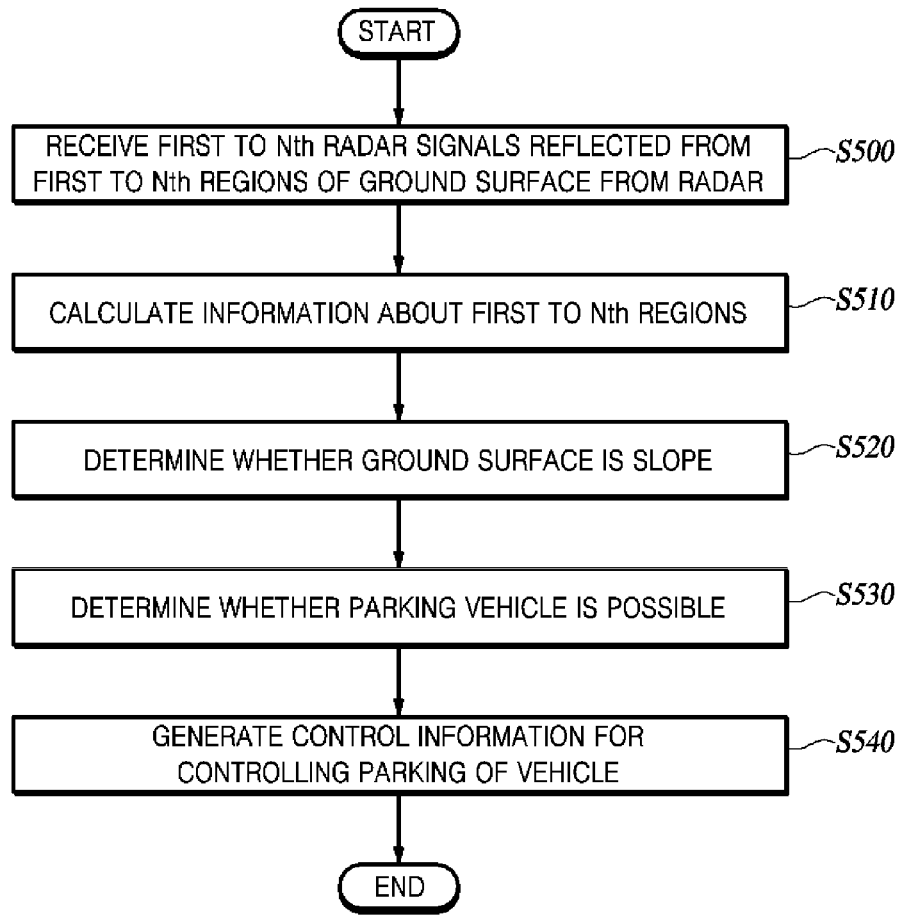
FIG. 5 is a flowchart for describing a parking control method according to one embodiment of the present disclosure.

FIG. 5 is a flowchart for describing a parking control method according to one embodiment of the present disclosure.

A parking control apparatus 110 may be configured to receive first to $N^{th}$ radar signals reflected from first to $N^{th}$ regions (N is a natural number) of a ground surface from one or more radars disposed in a vehicle 10 (S500).

The parking control apparatus 110 may be configured to calculate information about the first to $N^{th}$ region based on the first to $N^{th}$ radar signals (S510). According to one embodiment of the present disclosure, the parking control apparatus 110 may be configured to calculate a vertical distance and a horizontal distance between the vehicle and the first to $N^{th}$ regions as the information about the first to $N^{th}$ regions. According to another embodiment of the present disclosure, the parking control apparatus 110 may be configured to calculate RCSs of the first to $N^{th}$ radar signals as the information about the first to $N^{th}$ regions.

The parking control apparatus 110 may be configured to determine whether a ground surface is a slope based on the information about the first to $N^{th}$ regions (S520). According to one embodiment of the present disclosure, when a difference between a first vertical distance between the vehicle and the first region and a second vertical distance between the vehicle and the second region is greater than a preset vertical distance limit, the parking control apparatus 110 may be configured to determine that the ground surface is the slope. According to one embodiment of the present disclosure, the parking control apparatus 110 may be configured to determine whether the ground surface is the slope based on a change amount between first to $N^{th}$ RCSs.

In response to determining that the ground surface is the slope, the parking control apparatus 110 may be configured to determine whether parking the vehicle 10 on the slope is possible based on the information about the first to $N^{th}$ regions (S530). According to one embodiment of the present disclosure, when a first horizontal distance between the vehicle and the first region or a second horizontal distance between the vehicle and the second region is less than a preset horizontal distance limit, the parking control apparatus 110 may be configured to determine that parking the vehicle 10 on the slope is impossible.

The parking control apparatus 110 may be configured to generate control information for controlling parking of the vehicle according to a determination result (S540). According to one embodiment of the present disclosure, in response to determining that parking the vehicle 10 on the slope is impossible, the parking control apparatus 110 may be configured to generate control information for braking the vehicle 10, control information for changing a route of the vehicle 10, and/or control information for notifying a driver of the vehicle of the corresponding fact.

Although operations S500 to S540 are illustrated in FIG. 5 as being sequentially performed, this is merely an exemplary description of the technical idea of one embodiment of the present disclosure. In other words, those skilled in the art to which one embodiment of the present disclosure belongs may appreciate that various modifications and changes can be made without departing from essential characteristics of one embodiment of the present disclosure, that is, the sequence illustrated in FIG. 5 can be changed and one or more operations of operations S500 to S540 can be performed in parallel. Thus, FIG. 5 is not limited to the temporal order.

As described above, according to embodiments of the present disclosure, accidents such as vehicle damage can be prevented by recognizing conditions of a ground surface, which act as parking obstacle factors, such as a slope and a pothole, using radar.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Various embodiments of systems and techniques described herein can be realized by a programmable computer. Here, the computer includes a programmable processor, a data storage system (including a volatile memory, a non-volatile memory, another type of storage system, or combinations thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

Although exemplary embodiments of the present disclosure have been described for illustrative purposes, those skilled in the art will appreciate that various modifications, additions, and substitutions are possible, without departing from the idea and scope of the present disclosure. Therefore, exemplary embodiments of the present disclosure have been described for the sake of brevity and clarity. The scope of the technical idea of the present embodiments is not limited by the illustrations. Accordingly, one of ordinary skill would understand the scope of the present disclosure is not to be limited by the above explicitly described embodiments but by the claims and equivalents thereof.

What is claimed is:

1. A parking control apparatus comprising:
   a signal processor configured to receive first to $N^{th}$ radar signals reflected from first to $N^{th}$ regions of a ground surface from one or more radars disposed in a vehicle and to calculate information about the first to $N^{th}$ regions, wherein N is a natural number;
   a determinator configured to determine whether the ground surface includes a slope based on the information about the first to $N^{th}$ regions and to determine whether parking the vehicle is possible; and
   a controller configured to generate control information for controlling parking of the vehicle according to a determination result of the determinator,
   wherein the signal processor is further configured to calculate a first vertical distance between the vehicle and the first region and/or a first radar cross section (RCS) using the first radar signal obtained by a first detection angle of a radar, to calculate a first horizontal distance between the vehicle and the first region using the first radar signal obtained by the first detection angle of the radar, to calculate a second vertical distance between the vehicle and the second region and/or a second RCS using the second radar signal obtained by a second detection angle of the radar, which is different from the first detection angle, and to calculate a second horizontal distance between the vehicle and the second region using the second radar signal obtained by the second detection angle of the radar, and
   the determinator is further configured to determine that parking the vehicle is impossible when the first horizontal distance or the second horizontal distance is less than a preset horizontal distance limit.

2. The parking control apparatus of claim 1, wherein:
   the determinator is further configured to determine that the ground surface includes the slope when a difference between the first vertical distance and the second vertical distance is greater than a preset vertical distance limit.

3. The parking control apparatus of claim 1, wherein:
   the signal processor is further configured to calculate first to $N^{th}$ radar cross sections (RCSs) of the first to $N^{th}$ radar signals, and
   the determinator is further configured to determine whether the ground surface includes the slope based on a change amount between the first to $N^{th}$ RCSs.

4. The parking control apparatus of claim 1, further comprising a radar controller configured to control a detection angle of a radar such that the radar sequentially transmits the first to $N^{th}$ radar signals toward the first to $N^{th}$ regions, respectively.

5. The parking control apparatus of claim 1, further comprising a radar controller configured to control a plurality of different radars, each of which transmits a radar signal toward one region of the first to $N^{th}$ regions.

6. The parking control apparatus of claim 1, further comprising a radar controller configured to control a plurality of radars such that at least one radar among the plurality of radars transmits a radar signal toward the ground surface, and at least another radar among the plurality of radars transmits a radar signal toward a traveling direction of the vehicle.

7. The parking control apparatus of claim 1, wherein the controller is further configured to:
   in response to the determinator determining that the ground surface includes the slope and determining that parking the vehicle is impossible, generate control information for at least one of braking, changing of a route, or generating of a notification.

8. A parking control method comprising:
   receiving first to $N^{th}$ radar signals reflected from first to $N^{th}$ regions of a ground surface from one or more radars disposed in a vehicle;

calculating information about the first to $N^{th}$ regions based on the first to $N^{th}$ radar signals;

determining whether the ground surface includes a slope based on the information about the first to $N^{th}$ regions and whether parking the vehicle is possible; and generating control information for controlling parking of the vehicle according to a determination result, wherein the calculating includes calculating a first vertical distance between the vehicle and the first region and/or a first radar cross section (RCS) using the first radar signal obtained by a first detection angle of a radar, calculating a first horizontal distance between the vehicle and the first region using the first radar signal obtained by the first detection angle of the radar, calculating a second vertical distance between the vehicle and the second region and/or a second RCS using the second radar signal obtained by a second detection angle of the radar, which is different from the first detection angle, and calculating a second horizontal distance between the vehicle and the second region using the second radar signal obtained by the second detection angle of the radar, and the determining includes, when the first horizontal distance or the second horizontal distance is less than a preset horizontal distance limit, determining that parking the vehicle is impossible.

9. The parking control method of claim 8, wherein:

the determining includes, when a difference between the first vertical distance and the second vertical distance is greater than a preset vertical distance limit, determining that the ground surface includes the slope.

10. The parking control method of claim 8, wherein:

the calculating includes calculating first to $N^{th}$ radar cross sections (RCSB) of the first to $N^{th}$ radar signals, and the determining includes determining whether the ground surface includes the slope based on a change amount between the first to the $N^{th}$ RCSs.

11. The parking control method of claim 8, wherein the generating includes:

in response to determining that the ground surface includes the slope and that parking the vehicle is impossible, generating control information for at least one of braking, changing of a route, or generating of a notification.

* * * * *